(12) United States Patent
Kumar et al.

(10) Patent No.: US 11,122,346 B1
(45) Date of Patent: Sep. 14, 2021

(54) ATTESTATION IN OPTICAL TRANSPORT NETWORK ENVIRONMENTS

(71) Applicant: Cisco Technology, Inc., San Jose, CA (US)

(72) Inventors: Manoj Kumar, Fremont, CA (US); Sujal Sheth, Gujarat (IN); Zafar Ali, Hicksville, NY (US); Eric Voit, Bethesda, MD (US); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/912,238

(22) Filed: Jun. 25, 2020

(51) Int. Cl.
*H04Q 11/00* (2006.01)
*H04L 29/06* (2006.01)

(52) U.S. Cl.
CPC ......... *H04Q 11/0005* (2013.01); *H04L 63/10* (2013.01); *H04Q 11/0062* (2013.01); *H04Q 2011/0043* (2013.01); *H04Q 2011/0081* (2013.01); *H04Q 2213/13545* (2013.01)

(58) Field of Classification Search
CPC .......... H04Q 11/0005; H04Q 11/0062; H04Q 2213/13545; H04Q 2011/0081; H04Q 2011/0043; H04L 63/10; H04L 29/06; H04L 12/723; H04L 9/32; H04J 14/00; H04J 3/14; H04B 1/38; H04W 48/16; G02F 1/00

USPC ......................................................... 389/45
See application file for complete search history.

(56) References Cited

U.S. PATENT DOCUMENTS

| | | | | |
|---|---|---|---|---|
| 8,457,001 | B2* | 6/2013 | Madrahalli | H04J 14/0258 370/242 |
| 9,794,658 | B2* | 10/2017 | Viswanadham | H04Q 11/0062 |
| 9,882,634 | B1* | 1/2018 | Al Sayeed | H04L 43/50 |
| 2005/0221766 | A1* | 10/2005 | Brizek | H04W 12/108 455/73 |
| 2014/0314402 | A1* | 10/2014 | Moynihan | H04J 3/1652 398/17 |
| 2014/0359297 | A1* | 12/2014 | Langhammer | H04B 10/85 713/176 |
| 2017/0026113 | A1* | 1/2017 | Surek | H04Q 11/0062 |
| 2017/0244632 | A1* | 8/2017 | Tang | H04L 45/50 |

* cited by examiner

Primary Examiner — Abbas H Alagheband
(74) Attorney, Agent, or Firm — Polsinelli

(57) ABSTRACT

The present technology discloses methods, systems, and non-transitory computer-readable media for receiving, by a relying node in an optical transport network environment, attestation information in a trail trace identifier of an optical unit from an attester node in the optical transport network environment; verifying a trustworthiness of the attester node by identifying a level of trust of the attester node from the attestation information; and controlling network service access of the attester node through the relying node in the network environment based on the level of trust of the attester node identified from the attestation information.

20 Claims, 13 Drawing Sheets

US 11,122,346 B1

ATTESTATION IN OPTICAL TRANSPORT NETWORK ENVIRONMENTS

TECHNICAL FIELD

The present disclosure generally relates to the field of computer networking, and more particularly to discovering trustworthy devices through attestation and authenticating devices in an optical transport network.

BACKGROUND

Trustworthiness of a given device operating within a network may degrade from the time of its initial configuration. Active measurements may be needed to validate that a device is equivalently trustworthy to the time of its initial deployment. New technologies are adding capabilities which support the secure, real-time reporting of active trustworthiness measurements/evaluation from a remote device. However, the secure real-time reporting of active trustworthiness has not been adapted for the unique challenges present in optical transport networks (OTNs).

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
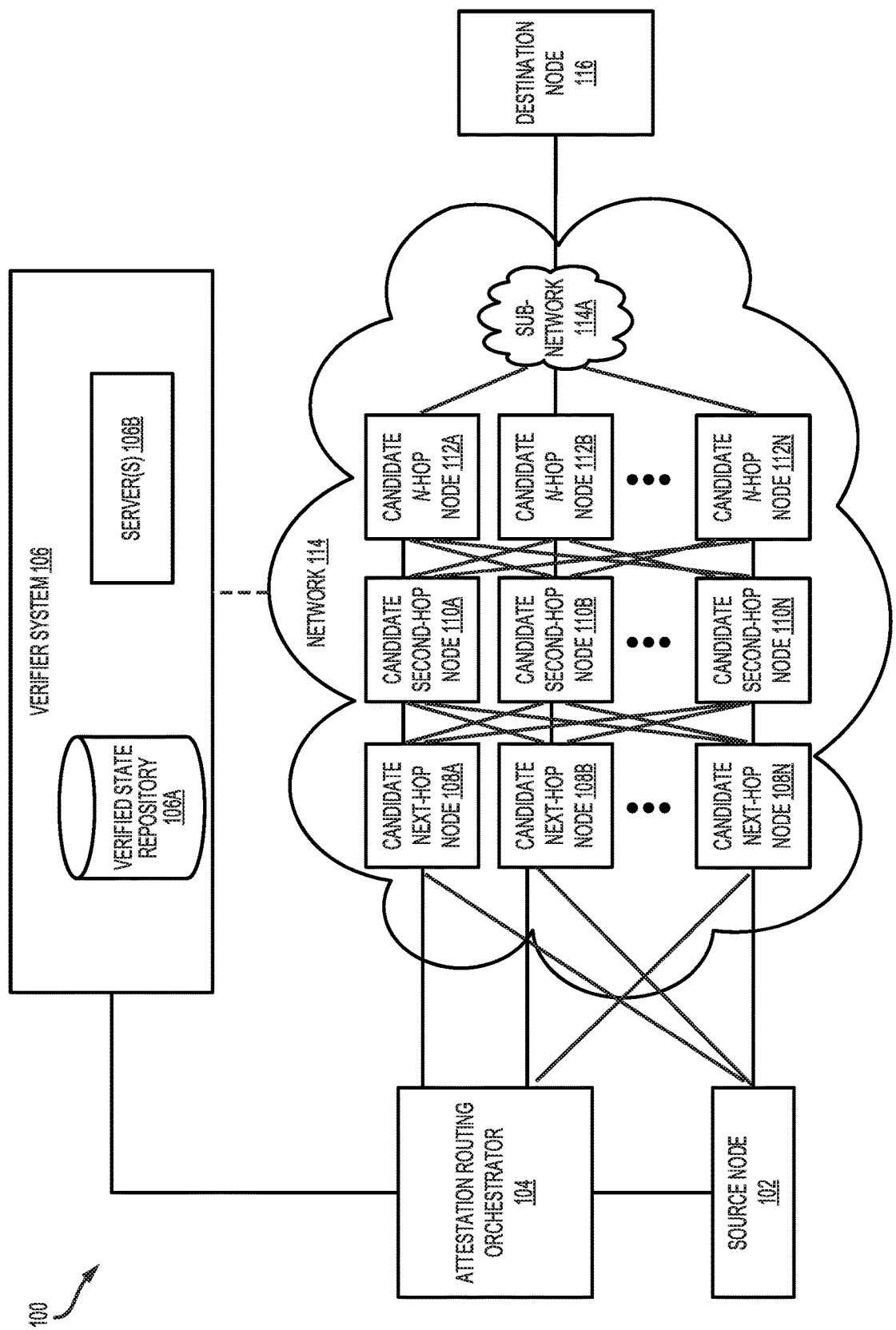
FIG. 1 illustrates an example networking environment in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for discovering trustworthy devices through attestation and authenticating devices in an optical transport network.

A method can include receiving, by a relying node in an optical transport network environment, attestation information in a trail trace identifier of an optical unit from an attester node in the optical transport network environment. The method can also include verifying a trustworthiness of the attester node by identifying a level of trust of the attester node from the attestation information. Further, the method can include controlling network service access of the attester node through the relying node in the network environment based on the level of trust of the attester node identified from the attestation information.

A system can include one or more processors and at least one computer-readable storage medium storing instructions which, when executed by the one or more processors, cause the one or more processors to receive, by a relying node in an optical transport network environment, attestation information from an attester node in the optical transport network environment. The instructions can also cause the one or more processors to verify a trustworthiness of the attester node by identifying a level of trust of the attester node from the attestation information. Further, the instructions can cause the one or more processors to control network service access of the attester node through the relying node in the network environment based on the level of trust of the attester node identified from the attestation information.

A non-transitory computer-readable storage medium having stored therein instructions which, when executed by a processor, cause the processor to receive, by a relying node in a first domain, attestation information from an attester node in a second domain, wherein communicating between the first domain and the second domain requires traversal of at least one node other than the relying node and the attester node. The instructions can also cause the processor to verify a trustworthiness of the attester node by identifying a level of trust of the attester node from the attestation information. Further, the instructions can cause the processor to control network service access of the attester node through the relying node in the first domain based on the level of trust of the attester node identified from the attestation information.

The foregoing, together with other features and embodiments, will become more apparent upon referring to the following specification, claims, and accompanying drawings.

Example Embodiments

The disclosed technology addresses the need in the art for discovering trustworthy devices through attestation and authenticating devices in an optical transport network. The present technology involves system, methods, and computer-readable media for verifying the trustworthiness of devices through an attestation protocol which can be implemented in an optical transport network.

Figure 11:
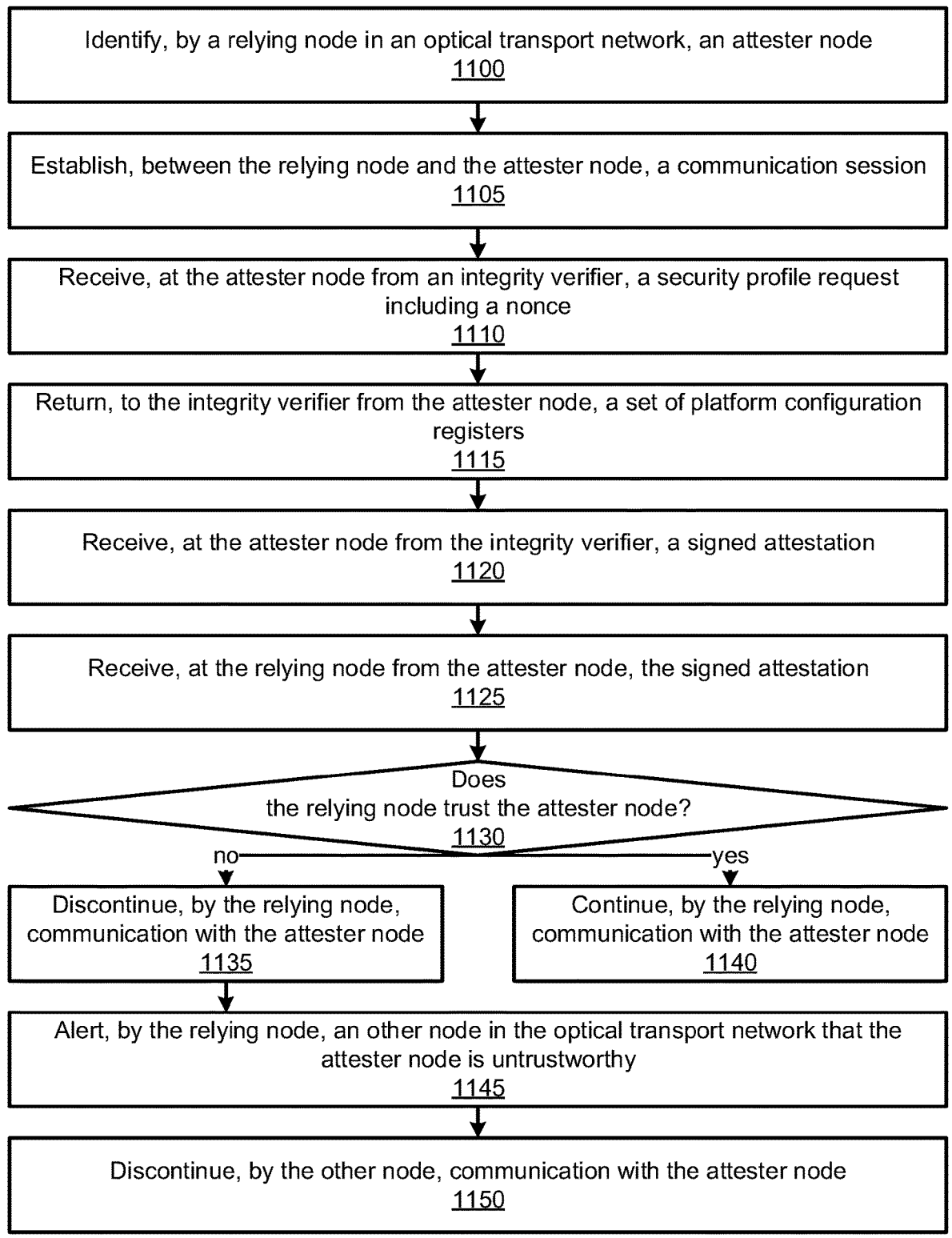
FIG. 11 illustrates an example method in accordance with some examples.
Figure 12:
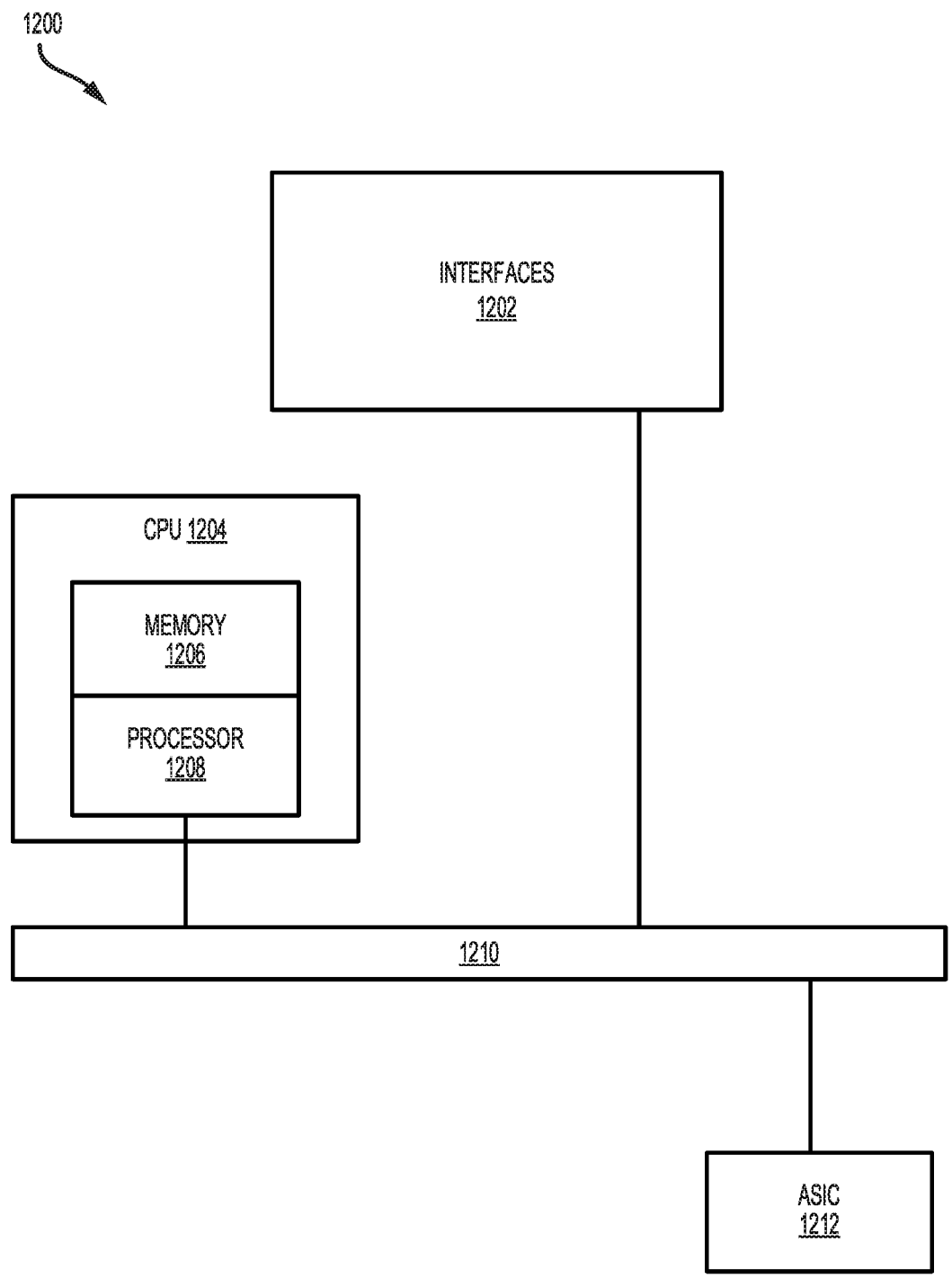
FIG. 12 illustrates an example network device in accordance with some examples.

The present technologies will be described in more detail in the following disclosure as follows. The disclosure begins with an initial discussion of systems and technologies for providing explicit verifiable proof of integrity of network nodes traversed by packets. A description of example systems, methods, and environments for providing verifiable proof of integrity of network nodes, as illustrated in FIGS. 1 through 4, will then follow. The discussion will then continue with a description of example systems, methods, and computer-readable media for discovering trustworthy devices through attestation and authenticating devices in an optical transport network, as shown in FIGS. 5 through 11. The discussion concludes with a description of an example network device and an example computing device architecture, as illustrated in FIGS. 11 and 12, including example hardware components suitable for performing various networking and computing operations described herein.

The disclosure now turns to an initial discussion of example concepts and technologies for providing verifiable proof of integrity of network nodes.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, Optical Transport Networks (OTN) etc. When data traffic is transmitted through one or more networks, the data traffic typically traverses a number of nodes that route the traffic from a source node to a destination node.

While having numerous nodes can increase network connectivity and performance, it also increases security risks as each node that data traverses introduces a risk of unauthorized data access and manipulation. For example, when a data unit traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., data unit processing, security or policy compliance verification, routing, etc.) on the data unit and that the data unit has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by data units. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in data units transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee or attester with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee or attester TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a data unit. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), Trail Trace Identifiers (TTI), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a data unit by each node that forwards the data unit.

When the data unit reaches a node (e.g., the destination node and/or an intermediate node) that removes IOAM metadata (e.g., an IOAM decapsulating node), the validity of the metadata element and/or token in the data unit can be verified to determine that the data unit traversed uncompromised nodes. In some examples, since canary stamps are time bound, the data unit trace timestamps defined in IOAM can be used to validate the canary stamp in the time window the data unit traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a data unit can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the data unit can forward the data unit with a new or updated canary stamp digest. In some examples, the new or updated canary stamp digest can be generated by a node as follows: IOAM canary stamp digest new value=Digest of (IOAM canary stamp digest old value||hash(canary stamp of the node)), where the IOAM canary stamp digest old value can refer to the canary stamp digest included in the data unit by one or more previous hops.

Moreover, in some cases, a Per Packet Nonce (PPN), where PPN changes per data unit and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash(canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the data unit was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the data unit traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in http://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attester, e.g. a node or a verifier, can use random numbers, otherwise pseudo-random numbers, created by peers and/or the attester to generate and verify attestation information. Specifically, the attester can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attester, can use the result created by the cryptoprocessor, to verify/validate that their corresponding provided random number was used in generating the nonce ultimately used by the cryptoprocessor to create the result. In turn, the layer 2 peers, potentially including the attester, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by data unit, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), an optical transport network, etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data unit that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in greater detail with reference to FIG. 4, in some cases, the attestation routing orchestrator 104 can select and direct a data unit to a particular candidate next-hop node of the candidate next-hop nodes 108A-108N based on a trusted state or image vector and the attestation states or vectors. Moreover, the attestation routing orchestrator 104 can direct the data unit destined for the destination node 116 to the particular candidate next-hop node.

Figure 2:
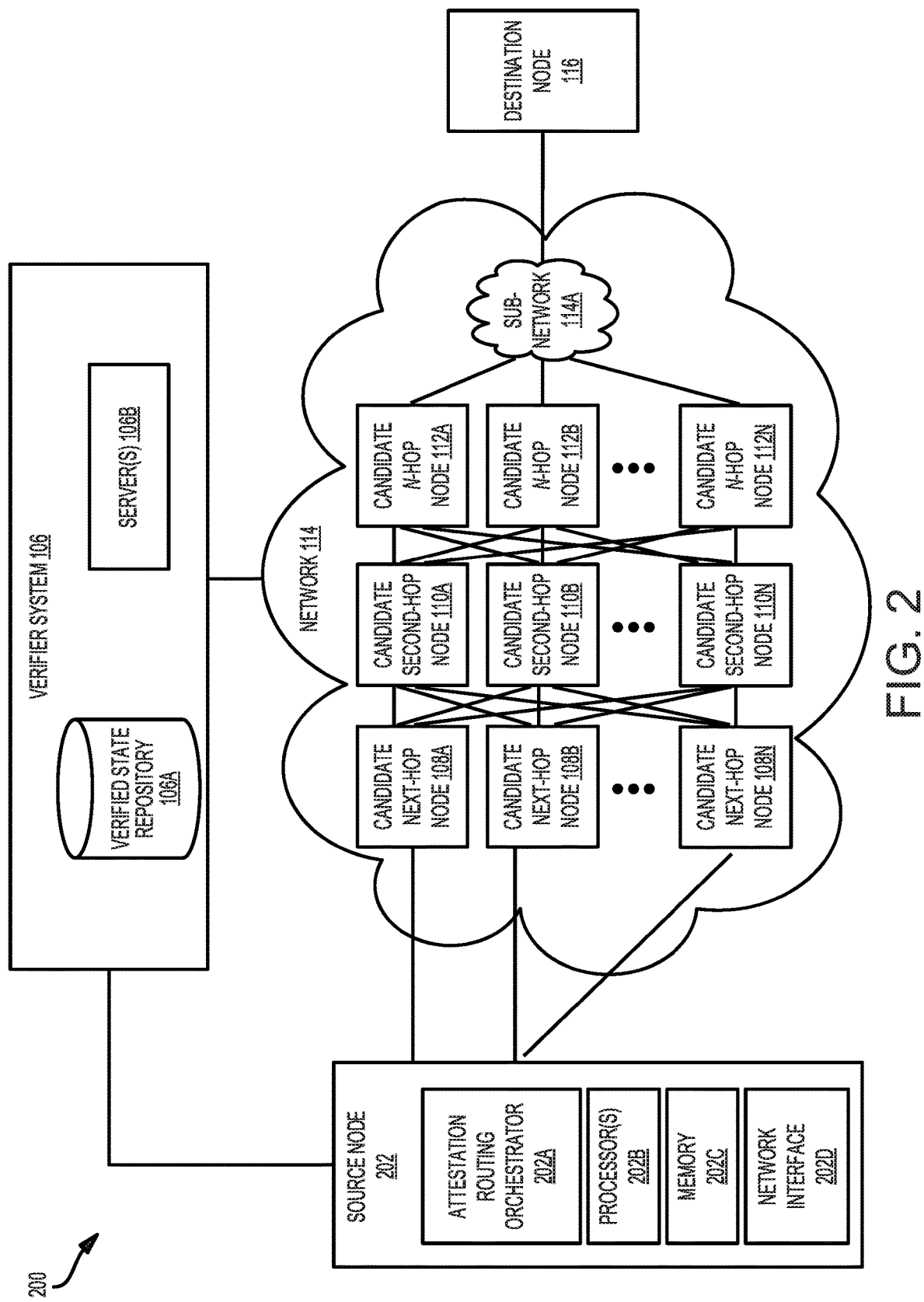
FIG. 2 illustrates an example networking environment in accordance with some examples.

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data units and states or vectors.

In some implementations, the source node 202 can select and direct a data unit to a particular candidate next-hop node based a trusted state or image vector and the attestation states or vectors.

Figure 3:
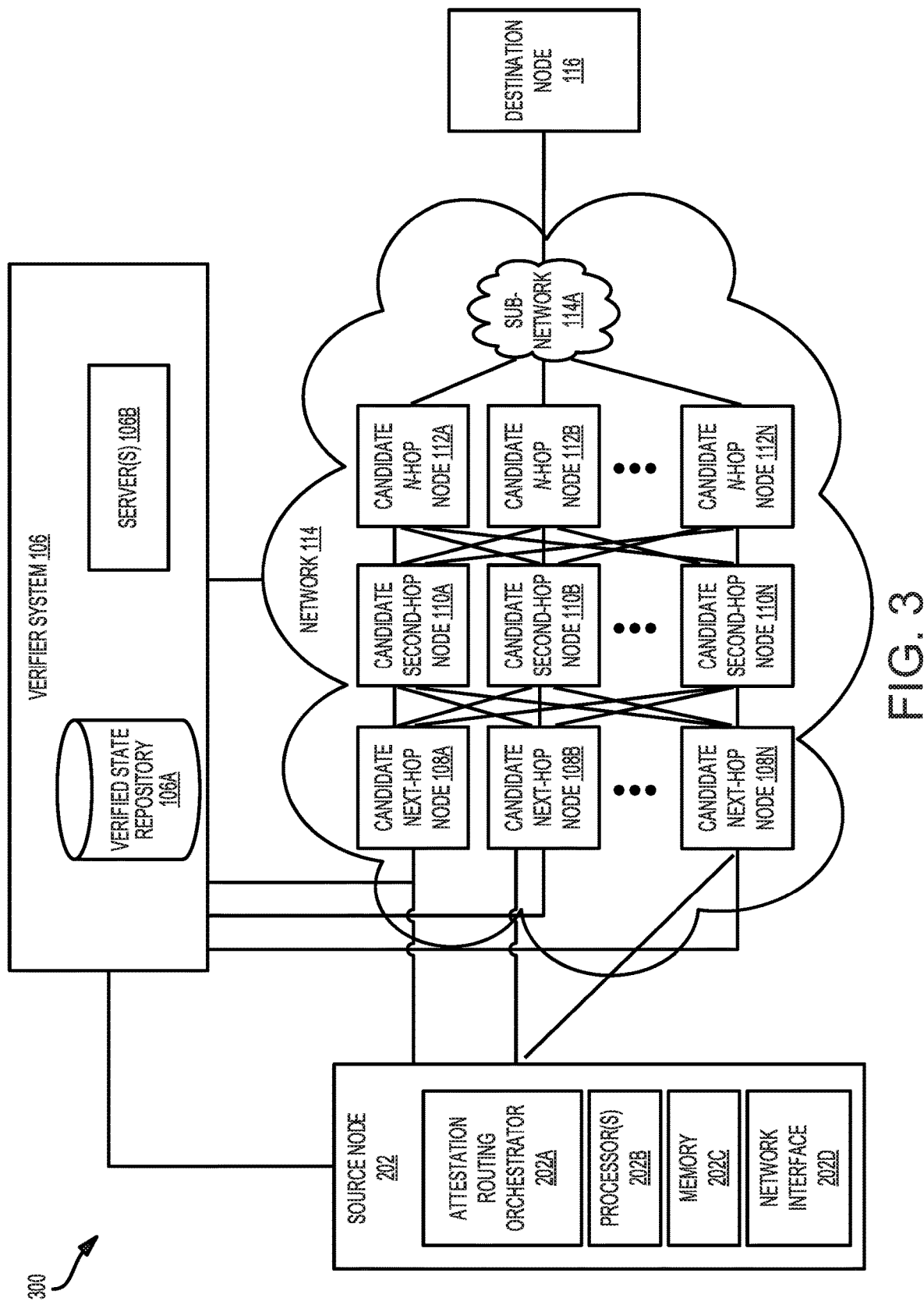
FIG. 3 illustrates an example networking environment in accordance with some examples.

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
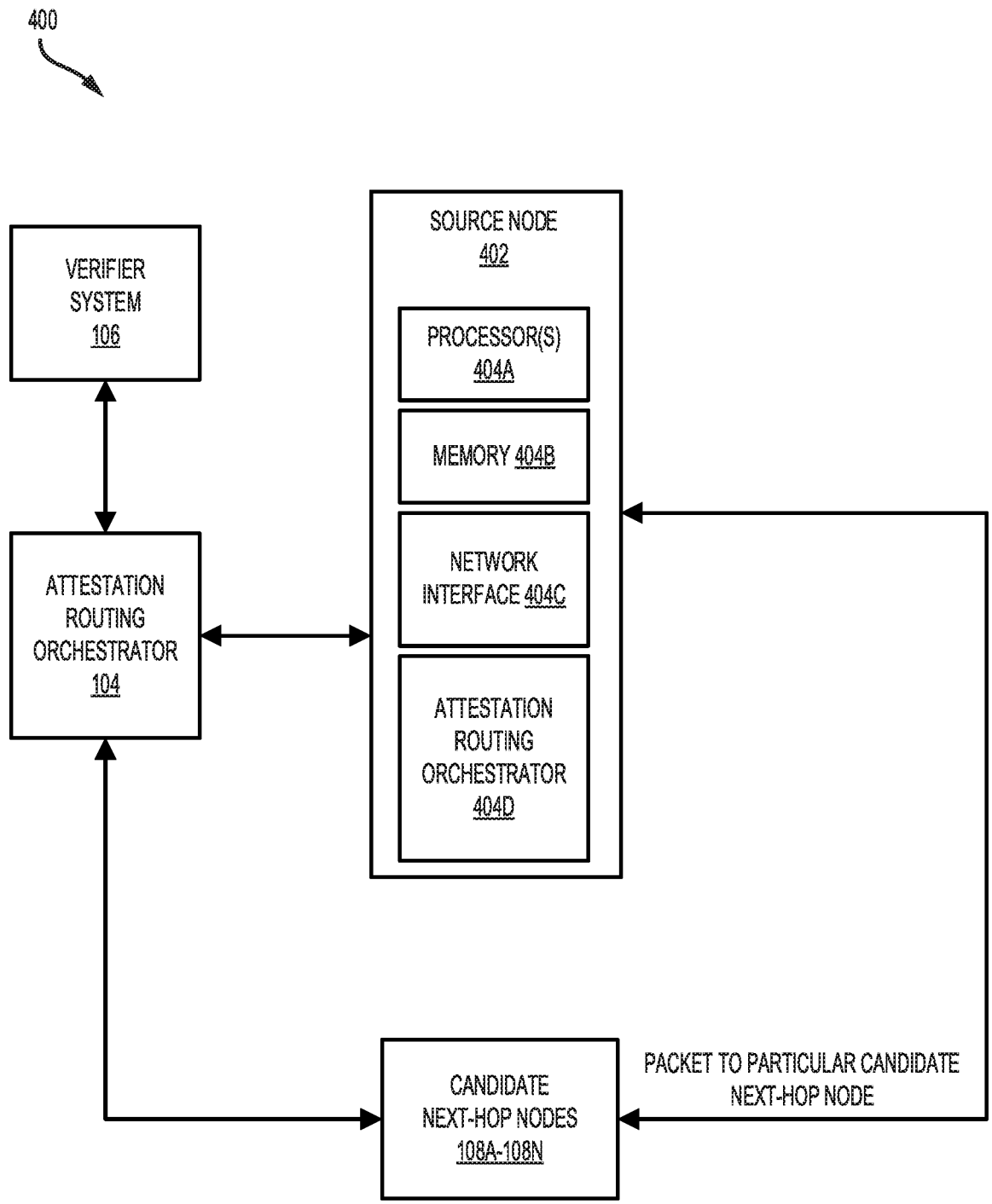
FIG. 4 illustrates an example of controller orchestrated attestation-based routing in accordance with some examples.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can directs, to the particular candidate next-hop node, a data unit destined for the destination node. For example, in some cases, the attestation routing orchestrator 104 can provide attested route information (e.g., validated canary stamp data, security measurements, etc.) to an attested route manager 402D of the source node 402 in order to facilitate the source node 402 sending the data unit to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data unit based on the identifier in order to route the data unit to the secure, particular candidate next-hop node.

As another example, in some implementations, the attested route information can include confidence scores associated with the candidate next-hop nodes 108A-108N. In this example, the attested route manager 402D can select a particular candidate score based on one or more selection criteria. Moreover, the attested route manager 402D can provide the data unit to the particular next-hop node associated with the particular candidate score. In some examples, the attestation routing orchestrator 104 can cease to direct additional data units to the particular candidate next-hop node in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data units to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

When there are no indicators (i.e., no security measurements or footprints available), the probability of a device being compromised can be a function of the time which has passed since a last validation that the device is in a known good state. In some cases, with the foregoing indicators, a formula can be provided for estimating probability or chance of a compromise on any given device operating within a network.

For example, $P\_v_1$ can be defined as a probability for compromise of type 1 when there is a specific set of events/signatures existing which correspond to the compromise. $P\_v_2$ can be defined as probability for compromise of type 2 and $P\_v_x$ can be defined as probability for compromise of type x. Assuming each of these compromises ($P\_v_1$ through $P\_v_x$) are independent, the following equation can provide the probability of a compromise based on recognized signatures ($P\_v$):

$$P\_v=1-((1-P\_v_1)(1-P\_v_2)(1-P\_v_x)) \qquad \text{Equation (1)}.$$

Other type of equations can be used instead of, or in conjunction with, equation (1) when there are interdependencies between different types of evaluated compromises ($P\_v_1$, $P\_v_2$, $P\_v_x$).

Furthermore, in some cases, a given probability (e.g., $P\_v_1$-$P\_v_x$) can be determined based on evidence of events from a device for which the probability of a compromise is being calculated (e.g., via equation (1)) and/or evidence obtained from one or more devices adjacent to the device for which the probability of a compromise is being calculated (e.g., via equation (1)).

In some cases, a probability that an invisible compromise has occurred at a device in the deployment environment can be expressed by the equation:

$$P_i=1-((1-\text{chance of invisible compromise in time period } t)^{\text{number of } t \text{ intervals since a last verification of a good/uncompromised system state}}) \qquad \text{Equation (2)}.$$

Effectively knowing $P_i$ can imply that an operator knows the half-life which should be expected before a device should be considered compromised independently of any concrete evidence. It should be noted that a probability of an invisible compromise does not have to be static. Real-time modification based on current knowledge of viruses/attacks may be allowed.

With formulates for visible and invisible factors as described above (equation (1) and equation (2)), an overall probability of a compromise for a given device may be given by:

$$P_c=1-((1-P_v)*(1-P_i)) \qquad \text{Equation (3)}.$$

Equation (3) provides an indicator of trustworthiness of a given device. This metric considers both time-based entropy and any available evidence which can be correlated to known compromises.

If $P_C$ can be calculated (or roughly estimated), various functions can be efficiently prioritized. For example, a controller may schedule when to do deeper validation (or perhaps direct refresh) of a device. This scheduling could include determining when to perform active checks to validate device memory locations (locations possibly containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of $P_C$. For example, routing or switching behavior might be adjusted/impacted based on the relative trustworthiness of a remote device. Where a higher $P_c$ values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

As discussed previously, new technologies are adding capabilities which support the secure, real-time reporting of active trustworthiness measurements/evaluation from a remote device. However, the secure real-time reporting of active trustworthiness has not been adapted for the unique challenges present in optical transport networks (OTNs).

The present technology includes systems, methods, and computer-readable media for addressing this need in the art. Specifically, the present technology involves system, methods, and computer-readable media for receiving, by a relying node in an optical transport network environment, attestation information in a trail trace identifier of an optical unit from an attester node in the optical transport network environment. In particular, the present technology involves systems, methods, and computer-readable media for verifying a trustworthiness of the attester node by identifying a level of trust of the attester node from the attestation information. Further, the present technology involves systems, methods, and computer-readable media for controlling network service access of the attester node through the relying node in the network environment based on the level of trust of the attester node identified from the attestation information.

The disclosure now turns to FIGS. 5-12, which discuss the application of attestation technology in an optical transport network (OTN).

An OTN contains certain properties which make the application of attestation technology require a specially-engineered solution. OTNs are comprised of a set of optical transport nodes connected by optical fibers. These nodes can provide functionalities such as transporting, multiplexing, switching, managing, and supervising optical channels carrying signals. Their architecture is defined by the International Telecommunication Union (ITU).

The implementation of an optical channel (OCh) in an OTN is done by means of a digital framed signal with digital overhead supporting necessary management requirements. This implementation results in two digital layer networks, or frames—the optical channel data unit (ODU) frame and the optical channel transport unit (OTU) frame. Thus, signals in OTNs can be in the OTU or ODU frames. Both frames include a variety of possible signals operating at different line rates, as defined by the ITU.

ODU can carry an information structure ODUk, wherein ODUk signal is the server layer signal for client signals. ODUk can be mapped to an analogous information structure OTUk in the OTU frame. In some embodiments, the present technology applies to attestation information contained in signals sent in the OTU or ODU frames.

Figure 5:
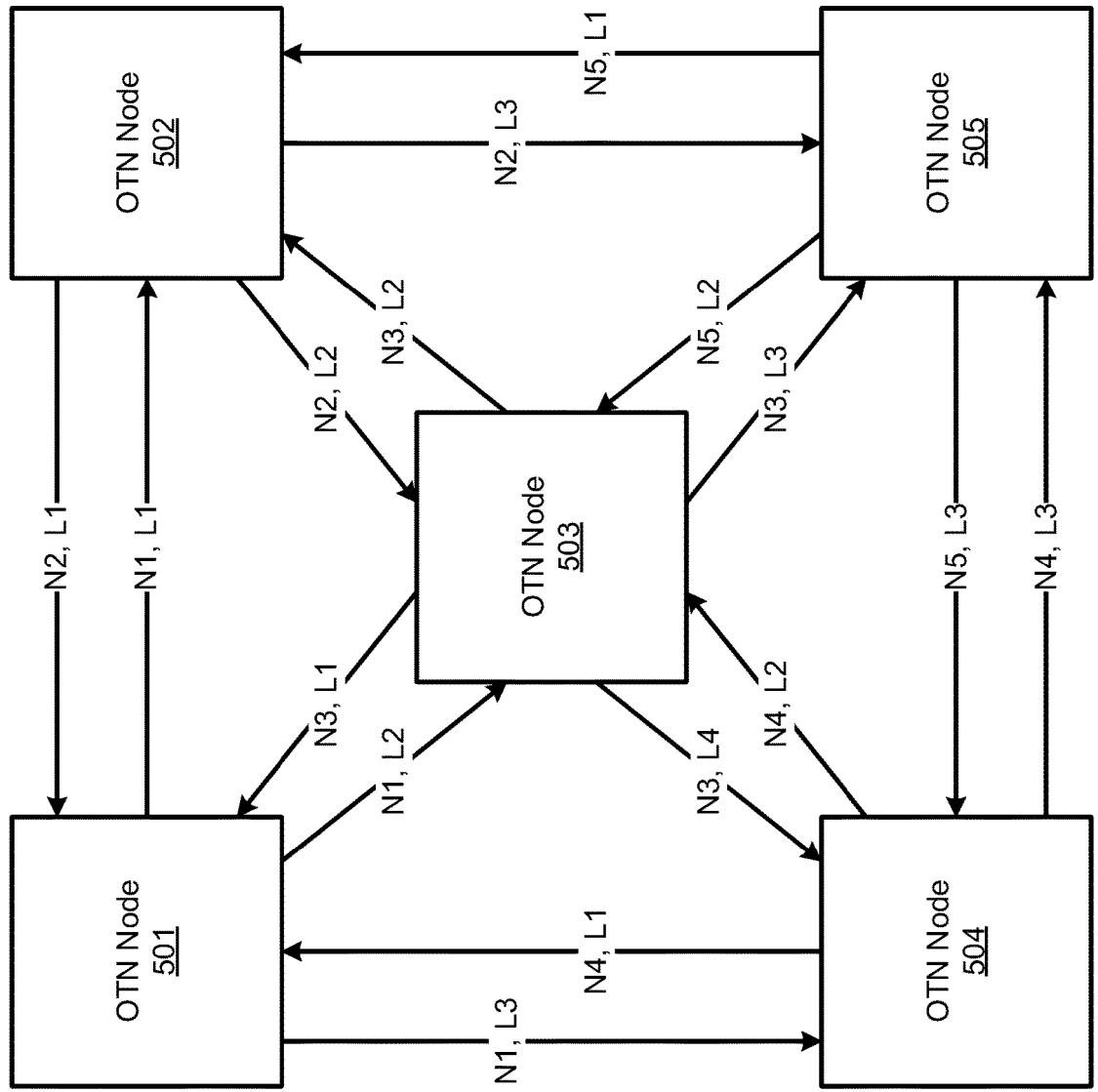
FIG. 5 illustrates an example system environment in accordance with some examples.

FIG. 5 illustrates an example system environment in accordance with some examples. An OTN is established by nodes in the network identifying other nodes and assigning ports to those nodes for communication.

In order to function in an OTN, OTN node 501 needs to connect to other nodes and establish the functionality that constitutes an OTN. For instance, OTN node 501 needs to detect and establish a connection with OTN node 502, an adjacent node in the network. OTN node 501 can establish a link state with neighbor OTN nodes 502, 503, and 504 using signal information embedded in a Trail Trace Identifier (TTI) advertised by OTN nodes 502, 503, and 504. A TTI is a 64-Byte signal that occupies one byte of the frame and is aligned with the OTUk multiframe. Link states can be established using the Open Shortest Path First (OSPF) routing protocol or other routing protocols.

When OTN node 501 receives a signal containing neighbor node information in a TTI, it can establish a link state with OTN node 502, 503, or 504. From the perspective of OTN node 501, a link state with OTN node 502 could comprise two identifiers: N2, indicating OTN node 502 as the node that the signal is coming from, and L1, indicating which port this signal comes from on OTN Node 502. This same process can occur for all OTN nodes 501, 502, 503, 504, and 505 in the network environment with their neighbor nodes.

Thus, signals from OTN node 502 to OTN node 501 are identified by the node (N2 for OTN node 502) and their port on that node (interface L1 on N2). Conversely, signals from OTN node 501 to OTN node 502 are identified by their node (N1 for OTN node 501) and their port on that node (interface L1 on N1).

In addition to building identifiers for connections with nearest neighbors, OTN node 501 can receive broader network topology information from any of OTN nodes 502, 503, or 504. For instance, OTN node 502 can inform OTN node 501 that OTN node 502, in addition to possessing a connection with OTN node 501, is connected to OTN nodes 503 and 505. Further, OTN node 505 can inform OTN node 502 that it is further connected to OTN nodes 503 and 504, and this information can be passed from OTN node 502 to OTN node 501. In this way, OTN node 501 can receive a connectome of the entire topology of the network. This is true for any OTN node 501, 502, 503, 504 or 505.

Figure 6:
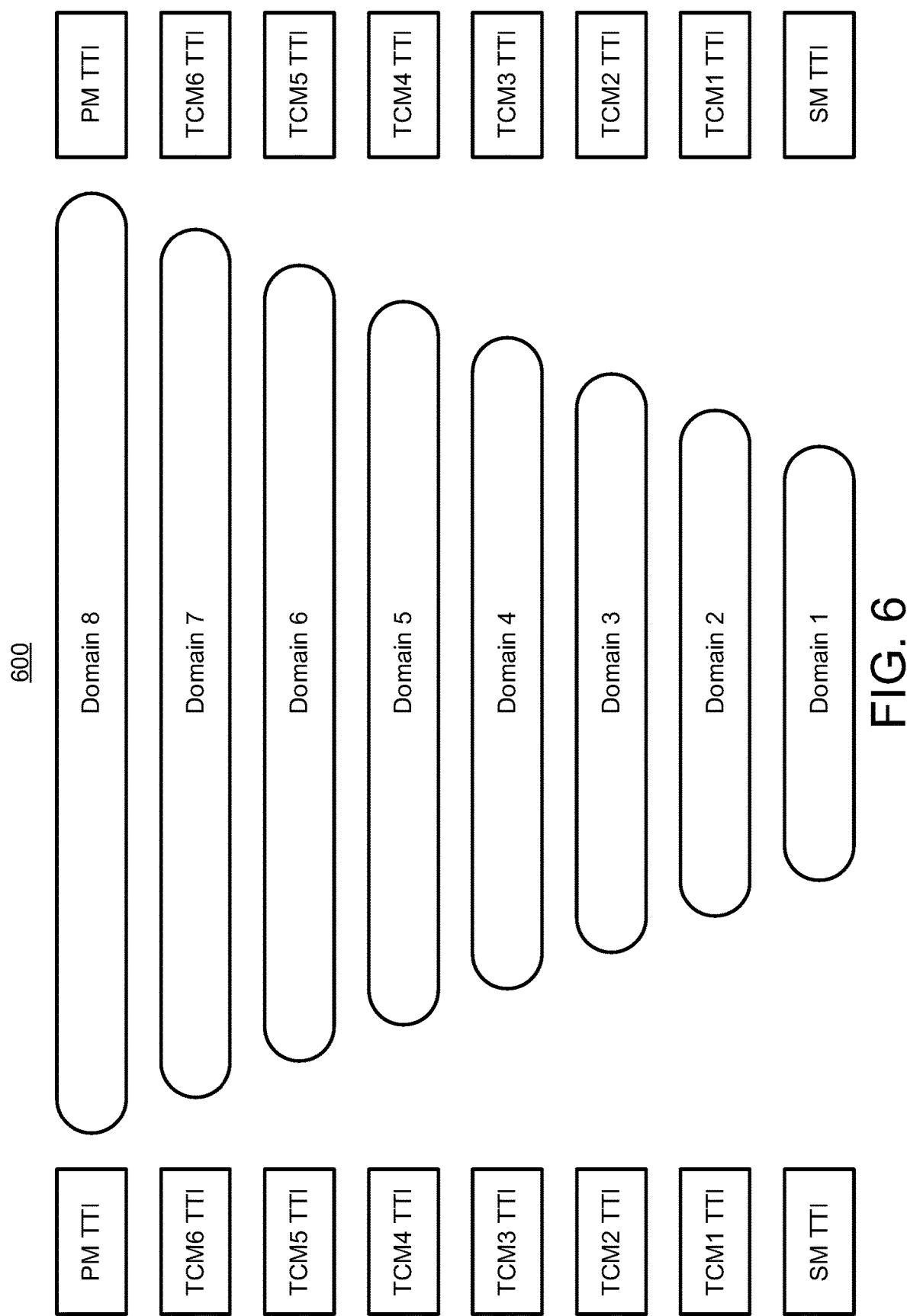
FIG. 6 illustrates a schematic reflecting the structure of tandem connection monitoring domains.

FIG. 6 illustrates a schematic 600 reflecting the structure of domains carrying TTIs, including tandem connection monitoring (TCM) domains. A tandem connection a bi-directional connection between two tandem connection terminating elements along an optical path. The tandem path is formed from a virtual container with maintenance signals carried in the path overhead. These maintenance signals enable monitoring of tandem paths, hence TCM.

Domain 1, the lowest-level domain, is the section monitoring (SM) domain. The SM domain is limited to direct links between nodes, such as the connection between OTN nodes 501 and 502.

Domains 2 through 7 comprise the TCM domains. The tandem connection can be between any two nodes on an optical path. For instance, OTN node 501 and OTN node 505 could communicate along domain 3 (TCM2 TTI) as they are path connected through any of OTN nodes 502, 503, or 504. Neighbor nodes can also use TCM domains. There is no standard for which TCM domain should be used for certain kinds of communications, and the domain can be agreed upon by the tandem connection terminating elements, such as OTN nodes 501, 502, 503, 504, and 505.

To create a TCM domain, SM domains must exist between every node encapsulated in the TCM domain. For instance, suppose OTN node 501 and OTN node 505 want to establish a TCM domain. This is only possible if OTN node 501 has established an SM domain with an intermediary node (such as OTN node 503) and OTN node 505 has also established an SM domain with that same intermediary (OTN node 503). This neighbor trust allows for TCM connections to be built over that infrastructure.

Domain 8, the highest-level domain, is the path monitoring (PM) domain. Domain 8 is reserved for end-to-end connections spanning the entire length of the signal. For instance, in an optical fiber Internet connection, domain 8 would be used to monitor the connection from an Internet server terminus to a user device terminus, covering every intermediate TCM domain and direct connections covered by SM domains.

Figure 7:
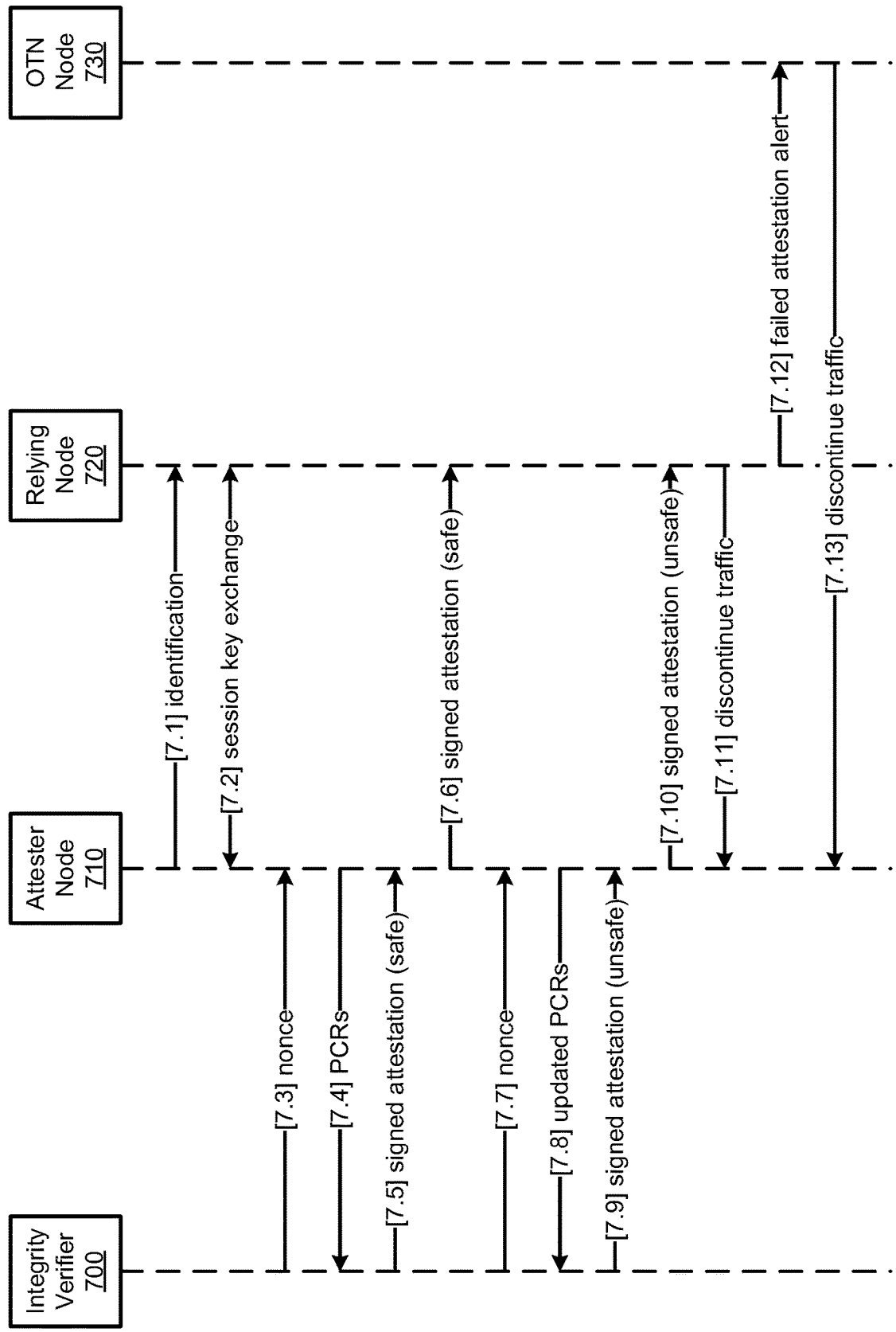
FIG. 7 illustrates a sequence diagram in accordance with some examples.

FIG. 7 illustrates a sequence diagram in accordance with some examples. A relying node assesses an attester node to determine if it can be safely used in signal transmission.

At process 7.1, relying node 720 identifies attester node 710. Relying node 720 and attester node 710 can be nodes in an OTN, similar to OTN nodes 501, 502, 503, 504, and 505. Identification and link state establishment can be done through OSPF routing protocols or other protocols. In OTNs, nodes are physically connected, and OTU and ODU signals can incorporate neighbor node identifications in TTIs.

At process 7.2, attester node 710 and relying node 720 establish a session for attestation. A session key is a single-use symmetric key used for encrypting all messages in one communication session, in this case for the attestation process. In some embodiments, unique secrets are provisioned to attester node 710 and relying node 720 during the manufacturing process. When a session key is needed, the unique secret creates a certificate with a new key derived from the unique secret. This certificate is then used to establish trust between attester node 710 and relying node 720 for the duration of the attestation process. Without this baseline level of trust that received messages have been untampered, it would be very difficult to attest the status of attester node 710.

At process 7.3, after a session has been established between attester node 710 and relying node 720, integrity verifier 700 can send a nonce to attester node 710 to begin the attestation process. Integrity verifier 700 serves as an independent device which can obtain and assess the security profile of attester node 710. In some embodiments, integrity verifier 700 can hold public keys corresponding to private keys held by cryptoprocessors on attester node 710, and use these public keys to validate digital signatures.

Upon receiving the nonce, at process 7.4 attester node 710 can return signed platform configuration registers (PCRs) to integrity verifier 700. PCRs provide a cryptographically secure measurement of the software state on attester node 710, both the software running on a platform and configuration data used by that software. The PCRs allow integrity verifier 700 to determine a level of trust for attester node 710.

At process 7.5, integrity verifier 700 sends a signed attestation to attester node 710 based on the assessment of the PCRs. In some embodiments, the signed attestation in the TTI can comprise a canary stamp. This signed attestation indicates that attester node 710 is safe to communicate with. At process 7.6, attester node 710 forwards the signed attestation to relying node 720 in a TTI of an OTU or ODU signal. In some embodiments, the signed attestation may take the form of a canary stamp. At this point, relying node 720 can place trust in attester node 710 and exchange traffic with it.

At some future point in the session, processes 7.3, 7.4, 7.5, and 7.6 are repeated as processes 7.7, 7.8, 7.9, and 7.10, respectively. There are a number of reasons why relying node 720 would receive an update on the attestation status of attester node 1210 during the session, such as a software update, reception of untrusted traffic, or elapsed time. However, during the re-attestation, the signed attestation indicates that attester node 710 should not be trusted.

At process 7.11, relying node 720 discontinues traffic between itself and attester node 710. Further, at process 7.12, relying node 720 alerts OTN node 730 of the failed attestation of attester node 710. In response, at process 7.13, OTN node 730 also discontinues traffic between itself and attester node 710.

In some embodiments, OTN nodes will rely on the link between relying node 720 and attester node 710 for transmission. Relying node 720 can send information to OTN endpoints using the link between relying node 720 and attester node 710 stating that at least a portion of the path between those OTN endpoints is untrustworthy. This information can specify a specific type of trustworthiness concern. Some examples of trustworthiness concerns include replacement of hardware chips or linecards, modification of software on OTN nodes, or other security concerns.

Figure 8:
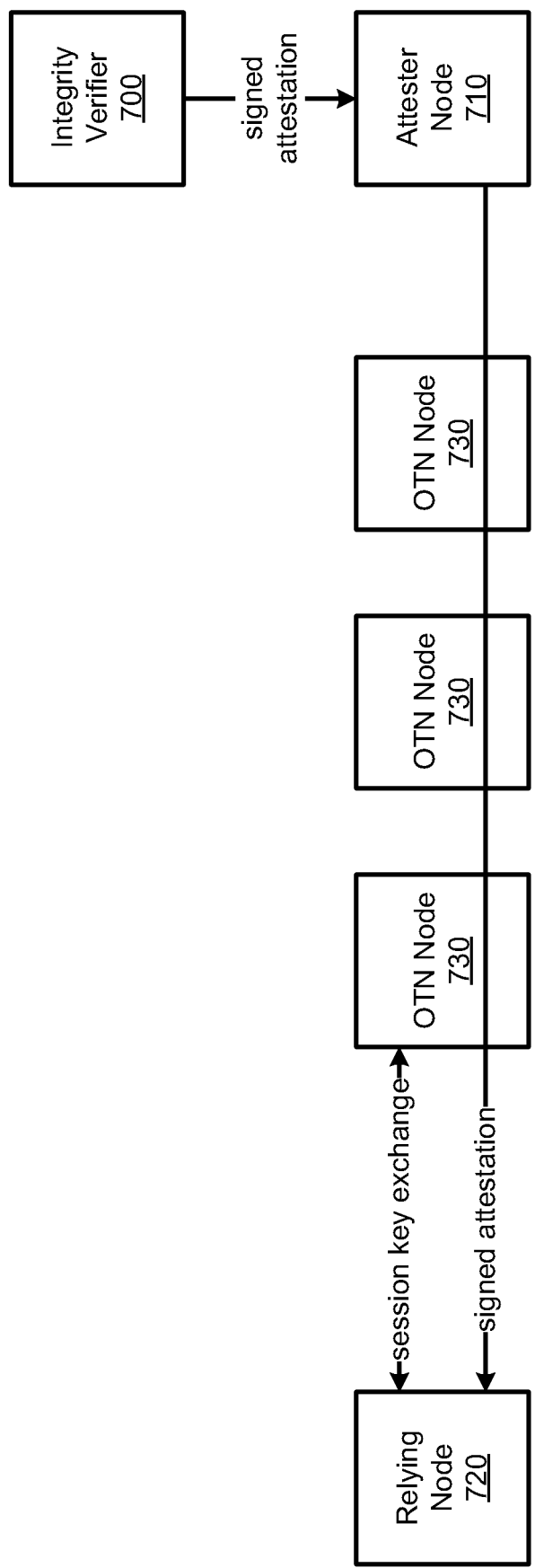
FIG. 8 illustrates an example system environment in accordance with some examples.

FIG. 8 illustrates an example system environment in accordance with some examples. A relying node can receive attestation from an attester node which is not a neighbor node.

Relying node 720 and one of OTN nodes 730 are neighbors, and can establish a session using a protocol as detailed in the description of FIG. 7. Similarly, attester node 710 can receive a signed attestation from integrity verifier 700 as detailed in the description of FIG. 7. However, in this instance, relying node 720 and attester node 710 are not neighbor nodes and exist at least one hop away from each other, and thus are unable to establish a standard session with each other as neighbor nodes can. OTN nodes 730 can serve a role as candidate next-hop nodes.

In some embodiments, each of OTN nodes 730 establish sessions with each other, and attester node 710 establishes a session with its neighbor OTN node 730. This connected sequence allows the signed attestation to pass along a series of sessions between neighbor nodes. In these embodiments, nodes need to trust their peers enough to trust their peers' peers, and so on.

In order to communicate across intermediate OTN nodes 730, attester node 710 and relying node 720 can establish a connection in a TCM domain. In some embodiments, attester node 710 and relying node 720 can be in networks operated by different service providers or governed by different policies. In these cases, TCM domains can still allow for communication between attester node 710 and relying node 720 via OTN nodes 730.

In some embodiments, attester node 710 and relying node 720 are able to communicate in such a way where sessions with intermediate OTN nodes 730 are unnecessary. The MACsec protocol, for instance, allows for encryption over a local Ethernet link, which is verified by exchanging keys and secrets between attester node 710 and relying node 720.

Figure 9:
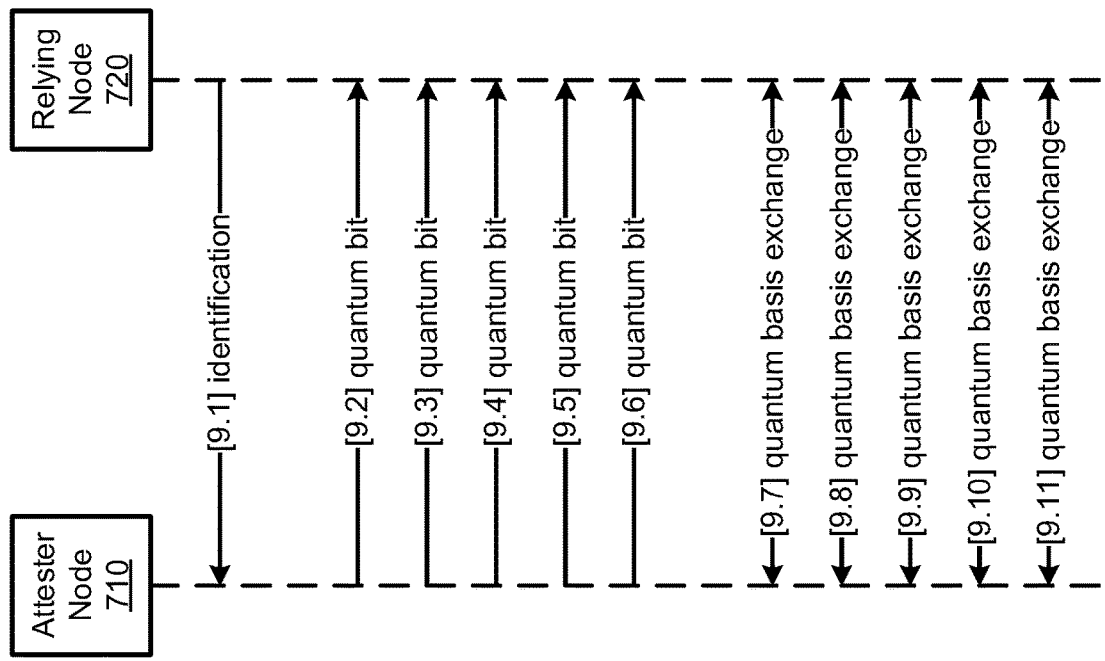
FIG. 9 illustrates a sequence diagram in accordance with some examples.

FIG. 9 illustrates a sequence diagram in accordance with some examples. Attester node 710 and relying node 720 establish a session using a quantum key exchange protocol. FIG. 9 illustrates the BB84 quantum key distribution protocol; however, other protocols can be used in other embodiments.

At process 9.1, relying node 720 identifies attester node 710 in the same manner specified in FIG. 5. Because the attester node 710 and relying node 720 are in an OTN, they possess an optical connection between them which can serve as the basis for a quantum key distribution, which can formulate a session in a different way than the method detailed in FIG. 5.

In processes 9.2, 9.3, 9.4, 9.5, and 9.6, attester node 910 sends a quantum bit to relying node 720. Attester node 710 creates a random bit and then randomly selects one of two non-orthogonal quantum bases (a common pair includes rectilinear and diagonal bases) to transmit the bit in. For the chosen bit and basis, attester node 710 creates a photon polarization state. The table below shows how bases and bits form photon polarization states:

| Basis | Bit = 0 | Bit = 1 |
| --- | --- | --- |
| Rectilinear (+) | ↑ | → |
| Diagonal (x) |  |  |

Once the photon polarization state is established, attester node 710 transmits a single photon in the state specified relying node 720. For each process 9.2, 9.3, 9.4, 9.5, and 9.6, attester node 710 records the bit value and basis for each transmitted photon.

By the laws of quantum mechanics, no one basis for measurement could distinguish between the four polarization states listed above, as the four states (vertical, horizontal, up-right diagonal, and down-right diagonal) are not orthogonal. If the photon was created in a horizontal or vertical polarization state, then a rectilinear basis would appropriately measure the value of the bit as 0 or 1, respectively. However, a diagonal basis of a horizontal or vertical polarization state would randomly return the value of the bit as 0 or 1. After this measurement the photon is polarized in the state it was most recently measured in, with all information about its initial polarization lost.

Relying node 720 receives the photons, but does not know the basis in which they were encoded, and must randomly guess what basis was used for each quantum bit. At processes 9.7, 9.8, 9.9, 9.10, and 9.11, attester node 710 shares the original bases used for sending with relying node 720 and relying node 720 shares the bases used for receiving with attester node 710. Bases that don't match are discarded, and the remaining bits are used as a shared key for the session. On average, half of the bits will be discarded.

Quantum key distribution of this sort allows for the creation of unique session keys without secrets needing to be provisioned during the manufacturing process, as described for FIG. 7. Nodes can autonomously generate unique session keys that cannot be used by an adversary.

Figure 10:
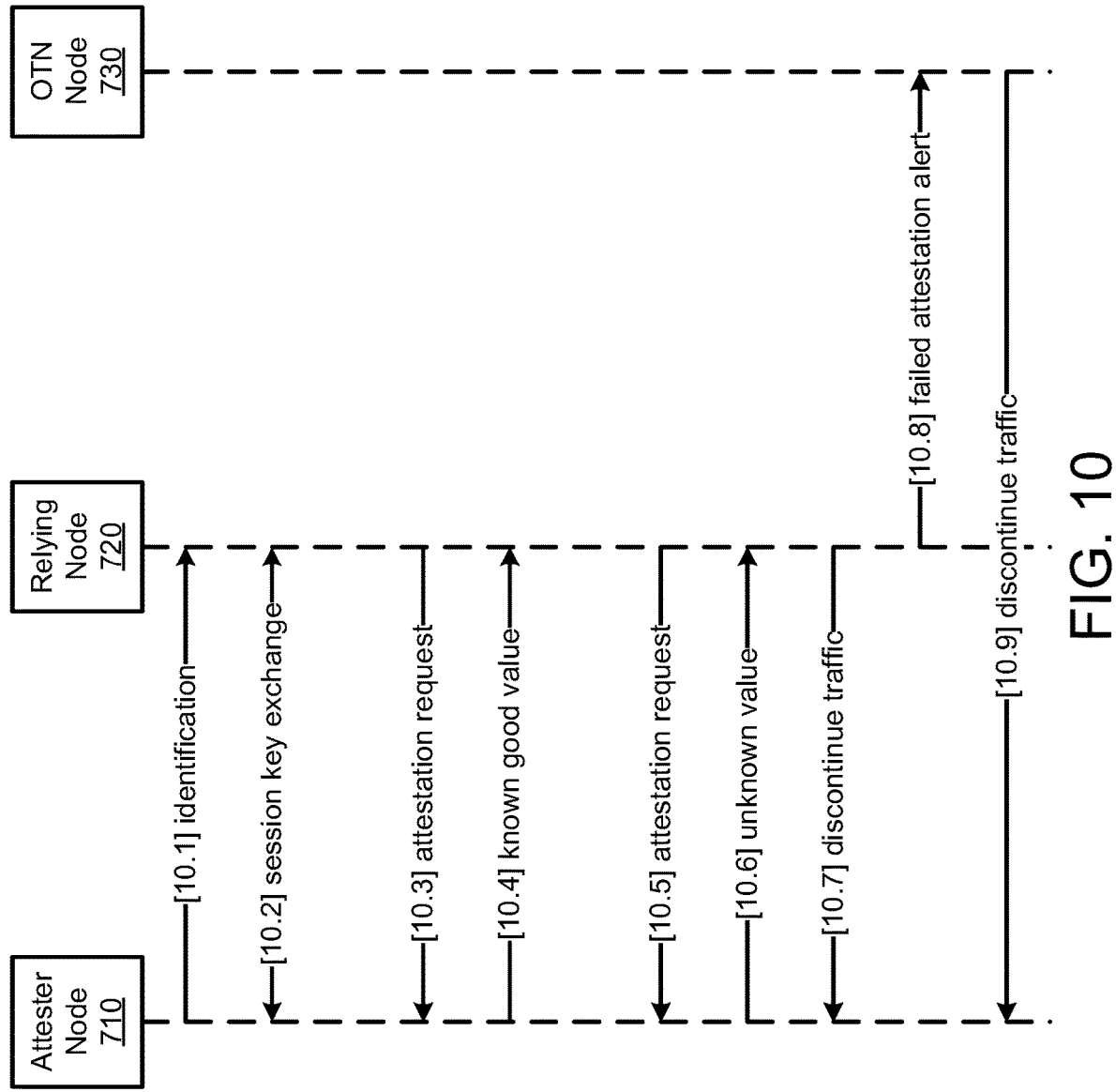
FIG. 10 illustrates a sequence diagram in accordance with some examples.

FIG. 10 illustrates a sequence diagram in accordance with some examples. In some embodiments, an integrity verifier is not needed to attest the security posture of attester node 710.

In some embodiments, nodes in an OTN may be able to generate values which are known to other nodes in the network and can be used to attest to the integrity of an attester node. This known good value can be generated based on, for instance, the order that software is loaded on a node when running validation. In some embodiments, an attester node and a relying node may have the same configuration, and thus would have the same known good value. In some embodiments, a relying node may be pre-loaded with knowledge of good values for other nodes in an OTN.

At process 10.1, relying node identifies attester node 710 and at process 10.2, a session is established between attester node 710 and relying node 720. This session may be established through traditional or quantum session key distributions.

At process 10.3, relying node 720 requests attestation of attester node 710, and at process 10.4 attester node 710 returns a known good value to relying node 720. Because relying node 720 already knows that the received value is good, it can confirm the integrity of attester node 710 without the use of an integrity verifier.

At process 10.5, relying node 720 requests a second attestation of attester node 710, and at process 10.6 attester node 710 returns an unknown value. An unknown value could be generated, for instance, by insertion of new software into the software loading order, or a change in the order by which software is loaded during validation.

Because relying node 720 does not know the received value, at process 10.7 it discontinues communication between itself and attester node 710. At process 10.8, it alerts OTN node 730 that attester node 710 failed an attempted attestation, and at process 10.9 OTN node 730 discontinues traffic between itself and attester node 710 as well.

FIG. 11 illustrates an example method in accordance with some examples.

The method begins when relying node 720 identifies (1100) attester node 710. In an OTN, nodes can be identified with a unique environmental identifier that establishes the identity of the node in the network, and a local port at which that node communicates. This information, carried in a TTI in an OTU or ODU signal, allows for the attester node 710 and relying node 720 to establish a link state for communication.

After identifying attester node 710, relying node 720 and attester node 710 establish (1105) a communication session. In some embodiments, sessions can be established using a traditional session key exchange, in which unique secrets loaded onto the nodes at manufacturing are used to generate a certificate with a new key derived from the unique secret. This certificate is then used to establish trust between attester node 710 and relying node 720 for the duration of the session. In other embodiments, sessions can be established independent of a central secret provisioner by using quantum key distribution. The BB84 protocol, among others, are known for use in OTNs.

Attester node 710 receives (1110) a security profile request including a nonce from integrity verifier 700. In response, attester node 710 returns (1115) a set of PCRs from its cryptoprocessor. PCRs provide a cryptographically secure measurement of the software state on attester node 710, both the software running on a platform and configuration data used by that software. Attester node 710 receives (1120) a signed attestation from integrity verifier 700 based on its assessment of the PCRs. In some embodiments, the signed attestation can be a canary stamp.

Relying node 720 receives (1125) the signed attestation from attester node 710 embedded in a TTI of an OTU or ODU signal. Based on the signed attestation, relying node 720 determines whether or not to trust (1130) relying node 720. In some embodiments, trust can be non-binary, and certain activities can be considered trustworthy whereas others cannot be. If relying node 720 trusts attester node 710, it continues (1140) to communicate with attester node 710, having verified its security profile.

If relying node 720 does not trust attester node 710, it discontinues (1135) communication, as relying node 720 has a failed security profile. It can alert (1145) another OTN node 730 regarding the failed attestation of attester node 1110, which in turn can choose to discontinue (1150) its own communication with attester node 710.

Figure 13:
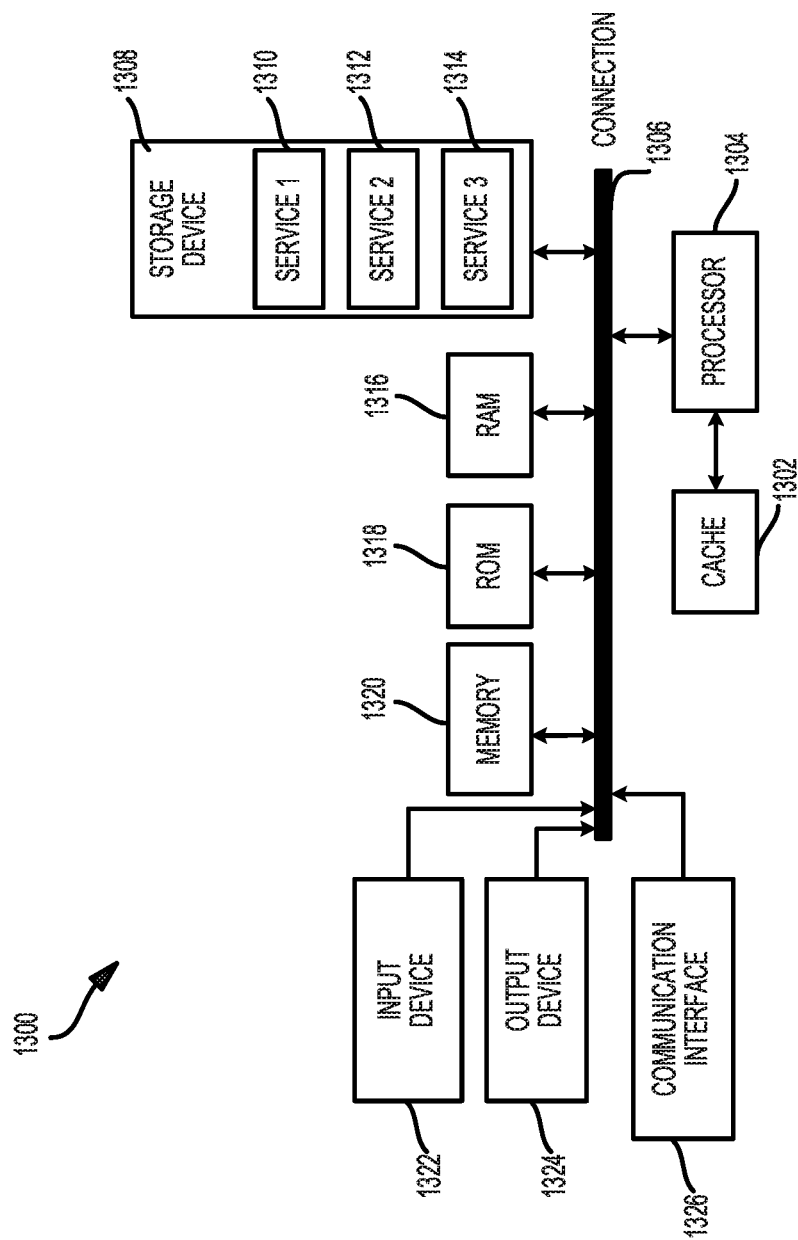
FIG. 13 illustrates an example computing device architecture in accordance with some examples.

The disclosure now turns to FIGS. 12 and 13, which illustrate example network nodes and computing devices, such as switches, routers, client devices, endpoints, servers, and so forth.

FIG. 12 illustrates an example network device 1200 suitable for performing switching, routing, and other networking operations. Network device 1200 includes a central processing unit (CPU) 1204, interfaces 1202, and a connection 1210 (e.g., a PCI bus). When acting under the control of appropriate software or firmware, the CPU 1204 is responsible for executing packet management, error detection, and/or routing functions. The CPU 1204 can accomplish these functions under the control of software including an operating system and any appropriate applications software. CPU 1204 may include one or more processors 1208, such as a processor from the INTEL X86 family of microprocessors. In some cases, processor 1208 can be specially designed hardware for controlling the operations of network device 1200. In some cases, a memory 1206 (e.g., non-volatile RAM, ROM, etc.) also forms part of CPU 1204. However, there are many different ways in which memory could be coupled to the system.

The interfaces 1202 are typically provided as modular interface cards (sometimes referred to as "line cards"). Generally, they control the sending and receiving of data packets over the network and sometimes support other peripherals used with the network device 1200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 1204 to efficiently perform routing computations, network diagnostics, security functions, etc.

Although the system shown in FIG. 12 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 1200.

Regardless of the network device's configuration, it may employ one or more memories or memory modules (including memory 1206) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1206 could also hold various software containers and virtualized execution environments and data.

The network device 1200 can also include an application-specific integrated circuit (ASIC) 1212, which can be configured to perform routing and/or switching operations. The ASIC 1212 can communicate with other components in the network device 1200 via the connection 1210, to exchange data and signals and coordinate various types of operations by the network device 1200, such as routing, switching, and/or data storage operations, for example.

FIG. 13 illustrates a computing system architecture 1300 including various components in electrical communication with each other using a connection 1306, such as a bus. Example system architecture 1300 includes a processing unit (CPU or processor) 1304 and a system connection 1306 that couples various system components including the system memory 1320, such as read only memory (ROM) 1318 and random access memory (RAM) 1316, to the processor 1304. The system architecture 1300 can include a cache 1302 of high-speed memory connected directly with, in close proximity to, or integrated as part of the processor 1304. The system architecture 1300 can copy data from the memory 1320 and/or the storage device 1308 to the cache 1302 for quick access by the processor 1304. In this way, the cache can provide a performance boost that avoids processor 1304 delays while waiting for data. These and other modules can control or be configured to control the processor 1304 to perform various actions.

Other system memory 1320 may be available for use as well. The memory 1320 can include multiple different types of memory with different performance characteristics. The processor 1304 can include any general purpose processor and a hardware or software service, such as service 1 1310, service 2 1312, and service 3 1314 stored in storage device 1308, configured to control the processor 1304 as well as a special-purpose processor where software instructions are incorporated into the actual processor design. The processor 1304 may be a completely self-contained computing system, containing multiple cores or processors, a bus, memory controller, cache, etc. A multi-core processor may be symmetric or asymmetric.

To enable user interaction with the computing system architecture 1300, an input device 1322 can represent any number of input mechanisms, such as a microphone for speech, a touch-sensitive screen for gesture or graphical input, keyboard, mouse, motion input, speech and so forth. An output device 1324 can also be one or more of a number of output mechanisms known to those of skill in the art. In some instances, multimodal systems can enable a user to provide multiple types of input to communicate with the computing system architecture 1300. The communications interface 1326 can generally govern and manage the user input and system output. There is no restriction on operating on any particular hardware arrangement and therefore the basic features here may easily be substituted for improved hardware or firmware arrangements as they are developed.

Storage device 1308 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1316, read only memory (ROM) 1318, and hybrids thereof.

The storage device 1308 can include services 1310, 1312, 1314 for controlling the processor 1304. Other hardware or software modules are contemplated. The storage device 1308 can be connected to the system connection 1306. In one aspect, a hardware module that performs a particular function can include the software component stored in a computer-readable medium in connection with the necessary hardware components, such as the processor 1304, connection 1306, output device 1324, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   receiving, by a relying node in an optical transport network environment, attestation information in a trail trace identifier of an optical unit from an attester node in the optical transport network environment;
   verifying a trustworthiness of the attester node by identifying a level of trust of the attester node from the attestation information;
   controlling network service access of the attester node through the relying node in the optical transport network environment based on the level of trust of the attester node identified from the attestation information; and
   in response to a determination, by the relying node, that the attester node has become compromised as a result of receiving second attestation information from the attester node, discontinuing transmission of data between the relying node and the attester node.

2. The method of claim 1, wherein the relying node is in a first domain and the attester node is in a second domain, and the trail trace identifier is included in a tandem connection monitoring communication defined by a tandem connection monitoring communication scheme, wherein communicating between the first domain and the second domain requires traversal of at least one node other than the relying node and the attester node.

3. The method of claim 1, wherein the attestation information is a canary stamp which includes include a signed measurement associated with the attester node for verifying trustworthiness of the attester node.

4. The method of claim 2, wherein the receiving of the attestation information in the trail trace identifier comprises receiving the attestation information at any domain level defined by the tandem connection monitoring communication scheme.

5. The method of claim 1, wherein the determination that the attester node has become compromised further comprising:
   determining by the relying node that the attester node has become compromised;
   sending a message to additional nodes in the optical transport network environment identifying the attester node as compromised; and
   discontinuing transmission of data on a link between the relying node and the attester node.

6. The method of claim 5, wherein the second attestation information indicates that the attester node has become compromised.

7. The method of claim 6, wherein information is passed to network elements using the link between the relying node and the attester node, the information communicating that at least a portion of the link is not trustworthy.

8. The method of claim 7, wherein the information communicating that at least a portion of the link is not trustworthy specifies a specific type of trustworthiness concern.

9. The method of claim 1, further comprising:
   prior to the receiving of the attestation information in the trail trace identifier of the optical unit from the attester node in the optical transport network environment, exchanging a communication key using quantum key distribution.

10. The method of claim 9, prior to exchanging the communication key, the method comprising:
    identifying the attester node by an attester node identifier and an environment identifier.

11. A system comprising:
    at least one processor; and
    a non-transitory computer-readable storage medium comprising instructions stored thereon which, when executed by the at least one processors, cause the at least one processors to:
       receive, by a relying node in an optical transport network environment, attestation information from an attester node in the optical transport network environment;
       verify a trustworthiness of the attester node by identifying a level of trust of the attester node from the attestation information;
       control network service access of the attester node through the relying node in the optical transport network environment based on the level of trust of the attester node identified from the attestation information; and
       in response to a determination, by the relying node, that the attester node has become compromised as a result of receiving second attestation information from the attester node, discontinue transmission of data between the relying node and the attester node.

12. The system of claim 11, wherein the relying node is in a first domain and the attester node is in a second domain, and the attestation information is included in a tandem connection monitoring communication defined by a tandem connection monitoring communication scheme, wherein communicating between the first domain and the second domain requires traversal of at least one node other than the relying node and the attester node.

13. The system of claim 11, wherein the attestation information is a canary stamp which includes include a signed measurement associated with the attester node for verifying trustworthiness of the attester node.

14. The system of claim 12, wherein the receiving of the attestation information comprises receiving the attestation information at any domain level defined by the tandem connection monitoring communication scheme.

15. The system of claim 11, wherein the determination that the attester node has become compromised further comprising instructions to cause the at least one processors to:
    determine by the relying node that the attester node has become compromised;
    send a message to additional nodes in the network identifying the attester node as compromised; and
    discontinue transmission of data on a link between the relying node and the attester node.

16. The system of claim 15, wherein the second attestation information indicates that the attester node has become compromised.

17. A non-transitory computer-readable medium comprising instructions stored thereon which, when executed by a processor, are effective to cause the processor to:
    receive, by a relying node in a first domain, attestation information from an attester node in a second domain, wherein communicating between the first domain and the second domain requires traversal of at least one node other than the relying node and the attester node;
    verify a trustworthiness of the attester node by identifying a level of trust of the attester node from the attestation information;
    control network service access of the attester node through the relying node in the first domain based on the level of trust of the attester node identified from the attestation information; and in response to a determination, by the relying node, that the attester node has become compromised as a result of receiving second attestation information from the attester node, discontinue transmission of data between the relying node and the attester node.

18. The non-transitory computer-readable medium of claim 17, wherein the attestation information is a canary stamp which includes include a signed measurement associated with the attester node for verifying trustworthiness of the attester node.

19. The non-transitory computer-readable medium of claim 17, wherein the determination that the attester node has become compromised further instructions to cause the processor to:
  determine by the relying node that the attester node has become compromised;
  send a message to additional nodes identifying the attester node as compromised; and
  discontinue transmission of data on a link between the relying node and the attester node.

20. The non-transitory computer-readable medium of claim 19, wherein the second attestation information indicates that the attester node has become compromised.

* * * * *